United States Patent
Nakamura

[11] 4,113,357
[45] Sep. 12, 1978

[54] TELEPHOTO LENS SYSTEM

[75] Inventor: Soichi Nakamura, Kamakura, Japan

[73] Assignee: Nippon Kogaku K. K., Tokyo, Japan

[21] Appl. No.: 638,708

[22] Filed: Dec. 8, 1975

[30] Foreign Application Priority Data

Dec. 28, 1974 [JP] Japan .................................. 50-1298

[51] Int. Cl.² ........................ G02B 13/02; G02B 9/60;
G02B 9/62; G02B 9/64
[52] U.S. Cl. .................................... 350/212; 350/214;
350/215; 350/216
[58] Field of Search ............... 350/212, 220, 225, 214,
350/215, 216

[56] References Cited
U.S. PATENT DOCUMENTS 2,440,088  4/1948  Grey .................... 350/212
2,582,085  1/1952  Tolle .................... 350/225
3,152,209  10/1964 Cox et al. ............... 350/225

OTHER PUBLICATIONS

Jenkins et al., "Fundamentals of Optics", McGraw-Hill, 3rd ed., pp. 169-171.

Primary Examiner—Conrad J. Clark
Attorney, Agent, or Firm—Shapiro and Shapiro

[57] ABSTRACT

A telephoto lens system consists of a first convergent group and a divergent group disposed rearwardly of the first group for forming a substantially afocal converter, and a second convergent group disposed rearwardly of said divergent group. The first convergent lens group and the divergent lens group are movable relative to each other along the optical axis of the lens system for effecting focusing.

14 Claims, 8 Drawing Figures

TELEPHOTO LENS SYSTEM

BACKGROUND OF THE INVENTION

1. Field of the Invention

This invention relates to a telephoto objective, and more particularly to a telephotographic objective.

2. Description of the Prior Art

In designing a telephotographic lens, reduction in size and decrease in the weight of such lens continue to be design parameters. The increased secondary spectrum due to decreasing the telephotoratio has been successfully corrected, by using large fluorite crystals or an anomalous dispersion glass. However, in focusing, it is conventional to telescopically move the entire optical system. If the amount of this movement is designated by x, the distance of the system from an object to be photographed is designated by R, and the focal length is designated by f, the relationship $$x = f^2/R$$

is satisfied. When R is constant, x increases as the square of f. In case of a super telephotographic objective for a 35 millimeter still-camera having a focal length larger than 300 millimeters, the movement of the objective will be larger, but the closest distance between the object and the camera is limited in view of the mechanical structure including the shift of the position of iris.

In order to overcome tbhis deficiency, the movement of the front lens or a part of the lens system is utilized for focusing as in the case of a zoom lens system. For example, in case of a typical telephotographic lens consisting of a first convergent lens group and a second divergent lens group, the telephoto-ratio is made less than unity when $f1 < F$, where $f1$ is the focal length of the first convergent lens group and F is the total focal length of the whole lens system. Consequently, the amount of movement of only the first convergent lens group for focusing is less than that of the whole system.

It is usual to share the burden of correcting aberration evenly by the first and second groups. When only the first group is moved, however, the variation in aberration in response to a focusing operation becomes so significant that this approach is impractical. A realizable first lens group will have an extremely deviated aberration. It has been impossible to design the second lens group to correct the deviated aberration so as to obtain the balanced aberrations for the whole lens system. On the other hand, when the second lens group is intended to be moved for focusing, the height of an incident ray at the center light flux relative to the first and second groups varies in response to the amount of the movement of the second group so that it is necessary to closely correct the various aberrations including spherical aberration of both groups; and this is extremely difficult to realize with a limited number of lenses. These conventional types of systems may be realized in accordance with Gaussian optical theory, but no satisfactory solution to aberration problems has been found.

SUMMARY OF THE INVENTION

An object of this invention is to provide a new and improved telephoto lens system which eliminates or substantially overcomes the above described deficiencies of the prior art. According to the present invention there is provided a telephoto lens system comprising a first convergent lens group and a divergent lens group disposed rearwardly of said first group. A second covergent lens group is disposed rearwardly of the divergent group and the first convergent lens group and the divergent lens group are movable relative to each other along the optical axis of the lens system for effecting focusing.

BRIEF DESCRIPTION OF THE DRAWING

Embodiments of the invention are shown in the accompanying drawings wherein.

DESCRIPTION OF THE PREFERRED EMBODIMENTS

The lens system of this invention consists of a first convergent lens group and a first divergent lens group disposed rearwardly of the first group for forming a substantially afocal telephoto converter and a second divergent lens group disposed rearwardly of the first divergent group. The term "rearwardly" is used in reference to the location of the object. If $f1$ is the focal length of the first convergent lens group, $f2$ is the focal length of the divergent lens group, $f3$ is the focal length of the second lens group, and F is the total focal length of the whole system, then the following relationship holds:

$$F = f1 \ (f3/f2)$$

Since this is a telephoto-lens, $F > f1$ so that $|f2| > f3$. Consequently, in order to focus, the amount of movement of the first group is smaller than the amount of movement of the whole system. And, when the second group is moved backwardly relative to the first group, the result is the same as if the first group were moved forwardly by the same amount relative to the second group, since the image point formed by the second group must remain at infinity. Therefore, the structure of the lens barrel is quite simple and compact and the focusing is simplified.

As to the first convergent lens group, the condition $1.8 \leq (f1/F) \cdot N \leq 3.0$ must be satisfied, where N is the F-number (maximum aperture) of the lens system. Below the lower limit of the abovmentioned condition, the first convergent lens group consisting of two or three components is apt to over-correct for spherical aberration so that it is difficult to correct the aberration at both infinity and the closest distance. If the upper limit is exceeded, the total focal length of the whole lens system becomes impractically large.

For eliminating the variation of aberrations due to movements of the first convergent group and the divergent group, it is necessary to use at least two components for the first convergent group.

And further, the relationship:

$$-1.0 < \frac{r1 + r2}{r1 - r2} < 0$$

must be satisfied, where $r1$ and $r2$ are radii of curvature of the first lens component of the first convergent group as viewed from the objectside; and the relationship:

$$-5.0 < \frac{r3 + rt}{r3 - rt} < -1.0$$

must be satisfied, where $r3$ is the radius of curvature of the front surface of the second lens component of the first group as viewed from the object-side and $rt$ is the radius of curvature of the rearmost surface of the first group. The second component is disposed rearwardly of the first component. Beyond said range, it is not possible to eliminate the variation of aberrations for an object at infinity and nearby.

Since a first covergent group satisfying the above-mentioned conditions has a significantly deviated aberration, correction thereof requires a divergent lens group with at least two components. With these two components, it is possible to maintain a good aberration balance from infinity to the closest phototaking distance. Furthermore, by constituting one of the two components of the divergent lens group by two lenses which are connected to each other or are disposed extremely close to each other, the divergent lens group may be achromatized, and the achromatic state of such a divergent lens group may be determined in consideration of the achromatic state of the first convergent lens group to thereby stabilize or minimize the achromatic aberration of the whole lens system.

For minimizing the achromatic variation due to curvature of image surface, the forward negative lens component in the divergent group should preferably be constituted by the two lenses in order to be achromatic.

Since the aberration variation at near distances can be eliminated by the first convergent group and the divergent lens group, the second covergent group can be constituted by a single positive lens component which corrects the spherical aberration as shown in the first example when the angle of field is relatively small. However, this single positive component must satisfy the relationship:

$$|r_0| > |r_I|$$

where $r_0$ is the radius of curvature of the surface of the forward face of the positive lens component, and $R_{IL}$ is the radius of curvature of the opposite surface.

Since the significantly deviated aberration in the first convergent lens is compensated for by the divergent lens group, the second convergent group may be any type, for example, a telephoto lens or long focal type having relatively smooth aberrations for mainly shifting in parallel the total aberration to obtain a suitable balanced aberration. In practice, it is preferable to use a lens group having a small number of lens components and a positive Pezval sum.

The following are preferable examples of this invention, where, $r1$, $r2$, $r3$ - - - denote radii of curvature of the surface of the lenses as viewed from an object, $d1$, $d2$, $d3$ - - - denote lens thicknesses and air spaces between lenses as viewed from an object, $n1$, $n2$, $n3$ - - - denote refractive index of glasses as viewed from an object, $v1$, $v2$, $v3$ - - - denote Abbe numbers of the glasses as viewed from an object.

EXAMPLE 1

| | | | $f = 100$ | $F/5.6$ | | |
|---|---|---|---|---|---|---|
| | | $r_1 = 36.366$ | | | | |
| | | | $d_1 = 2.25$ | $n_1 = 1.50032$ | $v_1 = 81.9$ | |
| | | $r_2 = -90.941$ | | | | |
| | | | $d_2 = 0.05$ | | | |
| f1 = | 39.6667 | $r_3 = 31.549$ | | | | |
| | | | $d_3 = 2.42$ | $n_2 = 1.50032$ | $v_2 = 81.9$ | |
| | | $r_4 = -56.162$ | | | | |
| | | | $d_4 = 0.5$ | $n_3 = 1.7495$ | $v_3 = 35.0$ | |
| | | $r_5 = 127.820$ | | | | |
| | | | $d_5 = 17.518 \rightarrow 19.0177$ | | | |
| | | $r_6 = -44.096$ | | | | |
| | | | $d_6 = 1.0$ | $n_4 = 1.69895$ | $v_4 = 30.0$ | |
| | | $r_7 = -13.345$ | | | | |
| | | | $d_7 = 0.333$ | $n_5 = 1.6425$ | $v_5 = 58.1$ | |
| f2 = | $-17.6667$ | $r_8 = 37.760$ | | | | |
| | | | $d_8 = 0.833$ | | | |
| | | $r_9 = 357.048$ | | | | |
| | | | $d_9 = 0.333$ | $n_6 = 1.6968$ | $v_6 = 55.6$ | |
| | | $r_{10} = 24.316$ | | | | |
| | | | $d_{10} = 2.777 \rightarrow 1.2768$ | | | |
| f3 = | 44.5378 | $r_{11} = -61.058$ | | | | |
| | | | $d_{11} = 0.833$ | $n_7 = 1.50032$ | $v_7 = 81.9$ | |
| | | $r_{12} = -16.3995$ | | | | |

Figure 1:
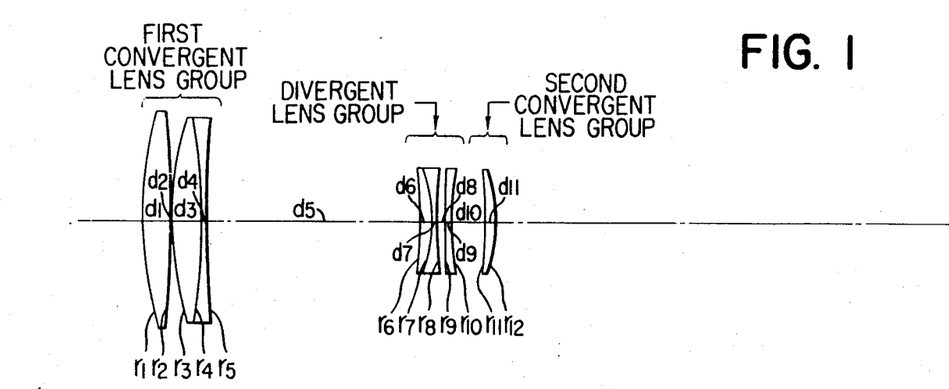
FIG. 1 shows a first embodiment of this invention, the lens component being positioned for an object located at infinity.
Figure 5:
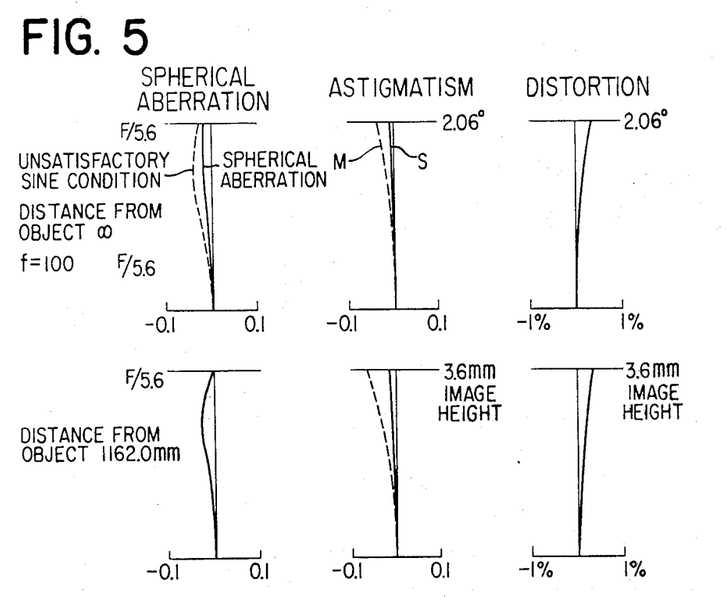
FIG. 5 shows aberration curves of the first embodiment where the distance from the film to an object is infinity, and is 1162.0 mm when focused by the movement of the divergent lens group.

In Example 1 of which the cross sectional view of the lens structure is shown in FIG. 1 and aberration curves are shown in FIG. 5, the first convergent lens group consists of two components: the forward one is a bi-convex positive component, and the rearward one is a meniscus component formed from a bi-convex lens cemented to a bi-concave lens. The divergent lens group consists of two components: the forward one is a bi-concave negative component formed from a meniscus positive lens cemented to a bi-concave negative lens, and the rearward one is a meniscus negative component. The second convergent lens group consists of a single meniscus positive lens concave as viewed from the object side of the system.

Backward movement of the divergent group by about 1.5 mm establishes a magnification ratio of about 1/10. In this case $d5 = 10.0177$, $d10 = 1.2768$, and the distance from the film surface to an object becomes 1162.0 mm.

EXAMPLE 2

| | | $f = 100$ | | $F/5.6$ | |
|---|---|---|---|---|---|
| | $r_1 = 30.557$ | $d_1 = 2.25$ | $n_1 = 1.50032$ | $\nu_1 = 81.9$ | |
| | $r_2 = -67.507$ | $d_2 = 0.05$ | | | |
| $f1 = 37.5$ | $r_3 = 27.078$ | $d_3 = 2.417$ | $n_2 = 1.50032$ | $\nu_2 = 81.9$ | |
| | $r_4 = -85.400$ | $d_4 = 0.417$ | | | |
| | $r_5 = -64.585$ | $d_5 = 0.667$ | $n_3 = 1.7495$ | $\nu_3 = 35.0$ | |
| | $r_6 = 65.816$ | | | | |
| | | $d_6 = 16.614 \rightarrow 17.947$ | | | |
| | $r_7 = -31.899$ | $d_7 = 1.083$ | $n_4 = 1.69895$ | $\nu_4 = 30.0$ | |
| | $r_8 = -10.884$ | $d_8 = 0.333$ | $n_5 = 1.60311$ | $\nu_5 = 60.7$ | |
| $f2 = -15.0$ | $r_9 = 56.259$ | $d_9 = 0.667$ | | | |
| | $r_{10} = -182.572$ | $d_{10} = 0.5$ | $n_6 = 1.6968$ | $\nu_6 = 55.6$ | |
| | $r_{11} = 18.670$ | | | | |
| | | $d_{11} = 2.888 \rightarrow 1.555$ | | | |
| $f3 = 40.222$ | $r_{12} = -49.985$ | $d_{12} = 0.833$ | $n_7 = 1.50032$ | $\nu_7 = 81.9$ | |
| | $r_{13} = -14.370$ | | | | |

Figure 2:
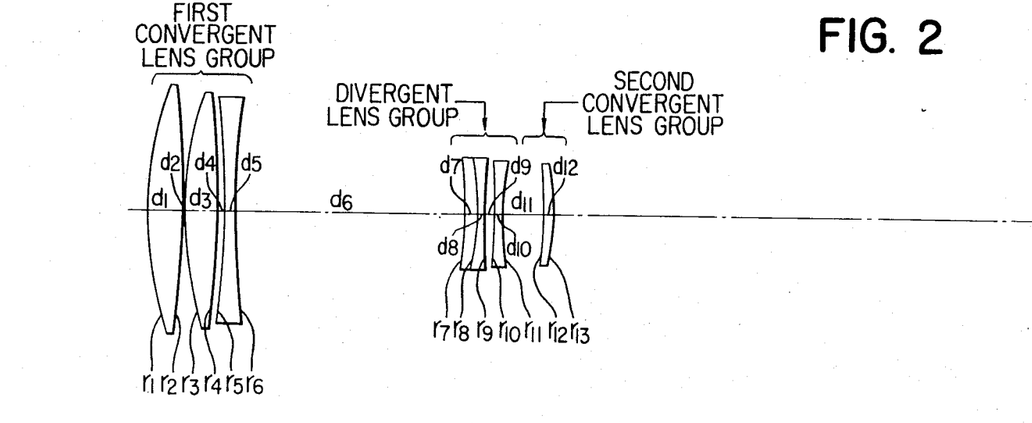
FIG. 2 shows a lens structure in accordance with a second embodiment of the invention.
Figure 6:
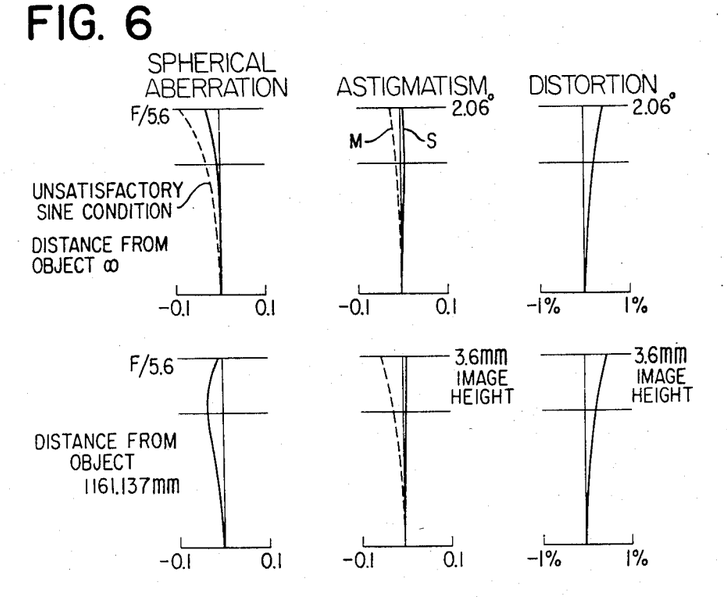
FIG. 6 shows aberration curves of the second embodiment, where the distance from the film to an object is infinity and is 1161.137 mm when focused by the movement of the divergent lens group.

In Example 2 of which the cross sectional view of the lens structure is shown in FIG. 2 and aberration curves are shown in FIG. 6, the first convergent lens group consists of two components: the forward one is a bi-convex positive component and the rearward one is a meniscus component formed from a bi-convex positive lens separated by an air-space from a bi-concave negative lens. The divergent lens group consists of two components: the forward one is a bi-concave negative component formed from a meniscus positive lens cemented to a bi-concave negative lens and the rearward one is a bi-concave negative component. The second convergent lens group consists of a single meniscus lens which is concave as viewed from the object-side of the system.

Backward movement of the divergent lens group by about 1.333 mm establishes a magnification ratio of about 1/10. In this case, the distance from the film surface to an object is 1161.137 mm.

EXAMPLE 3

| | | $f = 100$ | | $F/8$ | |
|---|---|---|---|---|---|
| | $r_1 = 44.142$ | $d_1 = 1.167$ | $n_1 = 1.5168$ | $\nu_1 = 64.2$ | |
| | $r_2 = -61.667$ | $d_2 = 0.033$ | | | |
| $f1 = 40.667$ | $r_3 = 29.157$ | $d_3 = 1.367$ | $n_2 = 1.50032$ | $\nu_2 = 81.9$ | |
| | $r_4 = -58.842$ | $d_4 = 1.167$ | $n_3 = 1.7495$ | $\nu_3 = 35.0$ | |
| | $r_5 = 83.740$ | | | | |
| | | $d_5 = 22.208 \rightarrow 24.541$ | | | |
| | $r_6 = 0.0$ | $d_6 = 0.8$ | $n_4 = 1.69895$ | $\nu_4 = 30.0$ | |
| | $r_7 = -14.985$ | $d_7 = 0.250$ | $n_5 = 1.5168$ | $\nu_5 = 64.2$ | |
| $f2 = -14.167$ | $r_8 = 15.833$ | $d_8 = 1.333$ | | | |
| | $r_9 = -18.333$ | $d_9 = 0.333$ | $n_6 = 1.61266$ | $\nu_6 = 44.3$ | |
| | $r_{10} = 39.917$ | | | | |
| | | $d_{10} = 4.483 \rightarrow 2.15$ | | | |
| | $r_{11} = 14.333$ | $d_{11} = 2.767$ | $n_7 = 1.50032$ | $\nu_7 = 81.9$ | |
| | $r_{12} = 79.515$ | $d_{12} = 18.6$ | | | |
| $f3 = 34.833$ | $r_{13} = -6.995$ | $d_{13} = 0.8$ | $n_8 = 1.76684$ | $\nu_8 = 46.6$ | |
| | $r_{14} = -11.790$ | $d_{14} = 0.067$ | | | |
| | $r_{15} = 0.0$ | $d_{15} = 1.7667$ | $n_9 = 1.51454$ | $\nu_9 = 54.6$ | |

-continued

| f = 100 | F/8 |
|---|---|
| $r_{16} = -11.798$ | |
| | Bf = 13.511 |

Figure 3:
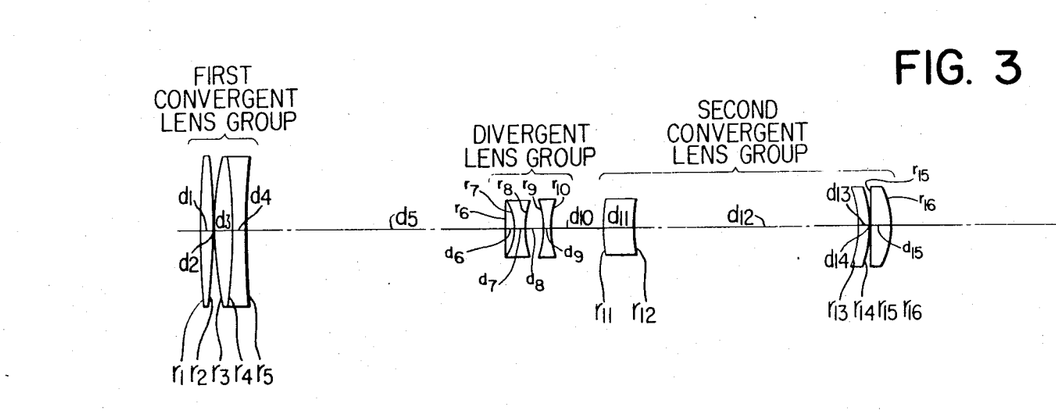
FIGS. 3 and 4 show lens structures in accordance with third and fourth embodiments, respectively.
Figure 7:
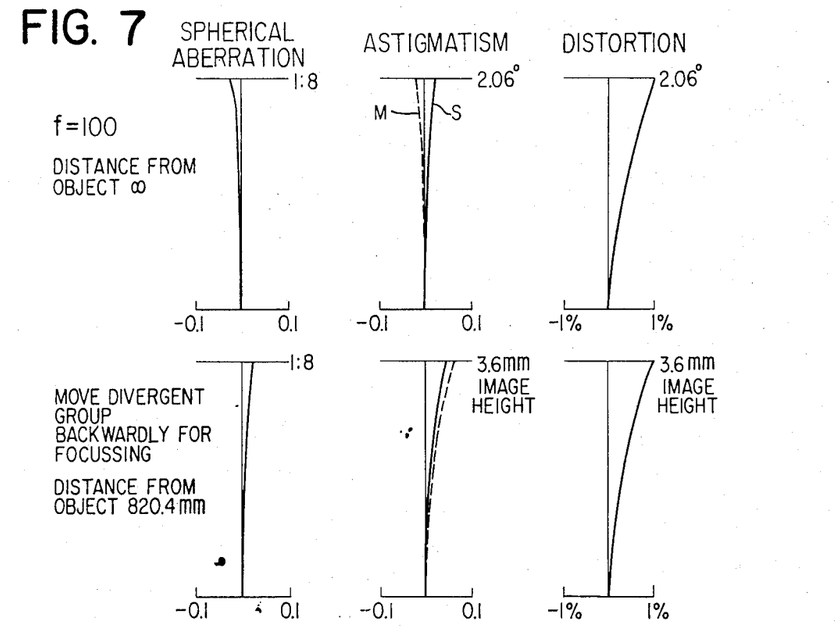
FIG. 7 shows aberration curves of the third embodiment, where the distance from the film to an object is infinity and is 820.4 mm when focused by the movement of the divergent lens group.

In Example 3 of which the cross-sectional view of the lens structure is shown in FIG. 3 and aberration curves are shown in FIG. 7, the first convergent lens group consists of two components: the forward one is a bi-convex positive component and the rearward one is a meniscus component formed of a bi-convex positive lens and a bi-concave negative lens. The divergent lens groups consists of two negative components. The second convergent lens group consists of a meniscus component and a positive component.

Backward movement of the divergent lens group by about 2.333 mm establishes a magnification ratio of about 1.7. In this case, $$d5 = 24.541 \text{ and } d10 = 2.15.$$

Further, when the first convergent lens group is moved forwardly by about 2.333 mm relative to the divergent lens group, a magnification ratio of about 1/7 is obtained; and in this case only $d5$ changes, to half its previous value.

EXAMPLE 4

| | | f = 100 | F/8 | | |
|---|---|---|---|---|---|
| | $r_1 = 22.409$ | $d_1 = 1.813$ | $n_1 = 1.50032$ | $\nu_1 = 81.9$ | |
| | $r_2 = -52.905$ | $d_2 = 0.038$ | | | |
| f1 = 28.125 | $r_3 = 21.406$ | $d_3 = 1.763$ | $n_2 = 1.50032$ | $\nu_2 = 81.9$ | |
| | $r_4 = -59.375$ | $d_4 = 0.388$ | | | |
| | $r_5 = -45.0$ | $d_5 = 0.625$ | $n_3 = 1.7495$ | $\nu_3 = 35.0$ | |
| | $r_6 = 55.968$ | | | | |
| | | $d_6 = 12.192 \rightarrow 13.067$ | | | |
| | $r_7 = -21.434$ | $d_7 = 0.813$ | $n_4 = 1.69895$ | $\nu_4 = 30.0$ | |
| | $r_8 = -8.861$ | $d_8 = 0.288$ | $n_5 = 1.5168$ | $\nu_5 = 64.2$ | |
| f2 = −11.25 | $r_9 = 60.284$ | $d_9 = 0.5$ | | | |
| | $r_{10} = -48.75$ | $d_{10} = 0.375$ | $n_6 = 1.6968$ | $\nu_6 = 55.6$ | |
| | $r_{11} = 13.432$ | | | | |
| | | $d_{11} = 1.472 \rightarrow 0.597$ | | | |
| | $r_{12} = -20.75$ | $d_{12} = 0.5$ | $n_7 = 1.51454$ | $\nu_7 = 54.6$ | |
| | $r_{13} = -10.399$ | $d_{13} = 28.067$ | | | |
| f3 = 40.0 | $r_{14} = -19.068$ | $d_{14} = 0.5$ | $n_8 = 1.5168$ | $\nu_8 = 64.2$ | |
| | $r_{15} = -28.75$ | $d_{15} = 0.375$ | $n_9 = 1.51118$ | $\nu_9 = 50.9$ | |
| | $r_{16} = -18.584$ | | | | |

Figure 4:
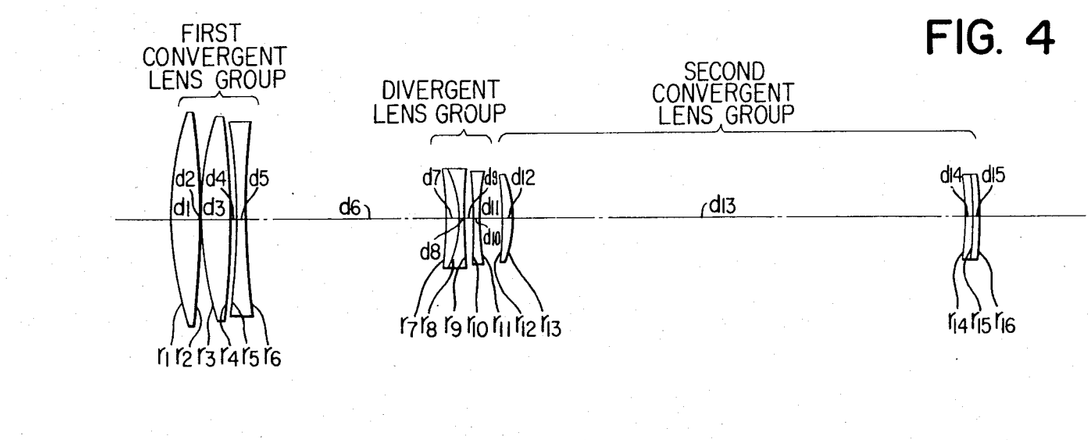
Figure 8:
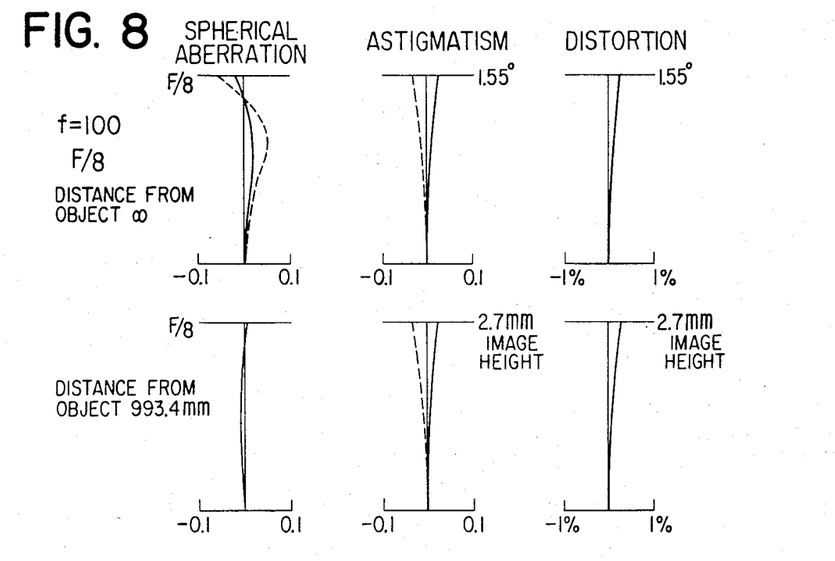
FIG. 8 shows aberration curves of the fourth embodiment where the distance from the film surface to an object is infinity and is 993.4 mm when focused by the movement of the divergent lens group.

In Example 4, of which the cross-sectional view of the lens structure is shown in FIG. 4 and the aberration curves are shown in FIG. 8, backward movement of the divergent lens group by about 0.875 mm establishes a magnification ratio of about 1/10. In this case, $d6 = 13.067$, $d11 = 0.597$ and the distance from an object to the film surface is 993.4 mm.

As hereinbefore explained, the variation in aberrations is small and a good aberration balance is obtained in case of focusing by relative movement between the divergent lens group and the first convergent lens group.

The present invention achieves a telephoto lens which is compact, and of low-weight, and which reduces the distance necessary to carry out close-out work, all to the end that the utility of the system is improved.

I claim:

1. A telephoto lens system comprising, in the order as viewed from the object side, a first convergent lens group movable along the optical axis of the system, a divergent lens group movable along the optical axis of the system and a second convergent lens group stationary for focusing, said first convergent lens group and said divergent lens group forming substantially an afocal system for an object at infinite distance, and focusing upon a nearer object being attained by the movement of one of said first convergent lens group and said divergent lens group to lengthen the air space therebetween.

2. A telephoto lens system according to claim 1, wherein said first convergent lens group is stationary, whereby focusing upon an object is attained by the movement of said divergent lens group.

3. A telephoto lens system according to claim 1, wherein said first convergent lens group includes at least two components, the forward one being a biconvex positive component and the rearward one being a positive meniscus component convex toward the object side, and wherein said divergent lens group includes at least two negative components.

4. A telephoto lens system according to claim 3, wherein said first convergent lens group satisfies the following conditions:

$$1.8 \leq \frac{f_1}{F} \cdot N \leq 3.0$$

$$-1.0 < \frac{r_1 + r_2}{r_1 - r_2} < \text{and}$$

$$-5.0 < \frac{r_3 + r_t}{r_3 - r_t} < -1.0$$

where $F$, $f_1$ and $N$ respectively represent the total focal length of said telephoto lens system, the focal length of the first convergent lens group and the F-number of said telephoto lens system $r_1$ and $r_2$ respectively represent radii of curvature of said biconvex positive component in the order from the object side, and $r_3$ and $r_t$ respectively represent radii of curvature of said positive meniscus component in the order from the object side.

5. A telephoto lens system according to claim 4, wherein said positive meniscus component of said first convergent lens group consists of a biconvex positive lens and a biconcave negative lens cemented to each other, and wherein the forward one of said negative components of said divergent group consists of a biconcave doublet component.

6. A telephoto lens system according to claim 5, wherein said second convergent lens group includes a positive meniscus component concave toward the object side.

7. A telephoto lens system according to claim 5, wherein said second convergent lens group includes a meniscus component convex toward the object side, a meniscus component concave toward the object side and a positive component.

8. A telephoto lens system according to claim 4, wherein said positive meniscus component of said first convergent lens group consists of a biconvex positive lens and a biconcave negative lens separated by air space from each other, and wherein the forward one of said negative components of said divergent lens group consists of a biconcave doublet component.

9. A telephoto lens system according to claim 8, wherein said second convergent lens group includes a positive meniscus component concave toward the object side.

10. A telephoto lens system according to claim 9, wherein said second convergent lens group further includes a meniscus component concave toward the object side.

11. A telephoto lens system according to claim 1, wherein

| | | f = 100 | F/5.6 | | |
|---|---|---|---|---|---|
| f1 = 39.6667 | $r_1$ = 36.366 | $d_1$ = 2.25 | | $n_1$ = 1.50032 | $v_1$ = 81.9 |
| | $r_2$ = −90.941 | $d_2$ = 0.05 | | | |
| | $r_3$ = 31.549 | $d_3$ = 2.42 | | $n_2$ = 1.50032 | $v_2$ = 81.9 |
| | $r_4$ = −56.162 | $d_4$ = 0.5 | | $n_3$ = 1.7495 | $v_3$ = 35.0 |
| | $r_5$ = 127.820 | | | | |
| | | $d_5$ = 17.518 → 19.0177 | | | |
| f2 = −17.6667 | $r_6$ = −44.096 | $d_6$ = 1.0 | | $n_4$ = 1.69895 | $v_4$ = 30.0 |
| | $r_7$ = −13.345 | $d_7$ = 0.333 | | $n_5$ = 1.6425 | $v_5$ = 58.1 |
| | $r_8$ = 37.760 | $d_8$ = 0.833 | | | |
| | $r_9$ = 357.048 | $d_9$ = 0.333 | | $n_6$ = 1.6968 | $v_6$ = 55.6 |
| | $r_{10}$ = 24.316 | | | | |
| | | $d_{10}$ = 2.777 → 1.2768 | | | |
| f3 = 44.5378 | $r_{11}$ = −61.058 | $d_{11}$ = 0.833 | | $n_7$ = 1.50032 | $v_7$ = 81.9 |
| | $r_{12}$ = −16.3995 | | | | | where, as viewed from the object side, $r_1$, $r_2$, $r_3$ - - - denote radii of curvature of the surface of the lenses; $d_1$, $d_2$, $d_3$ - - - denote lens thicknesses and air spaces between lenses; $n_1$, $n_2$, $n_3$ - - - denote refractive index of glasses; and $v_1$, $v_2$, $v_3$ - - - denote Abbe numbers of the glasses.

12. A telephoto lens system according to claim 1, wherein

| | | f = 100 | F/5.6 | | |
|---|---|---|---|---|---|
| f1 = 37.5 | $r_1$ = 30.557 | $d_1$ = 2.25 | | $n_1$ = 1.50032 | $v_1$ = 81.9 |
| | $r_2$ = −67.507 | $d_2$ = 0.05 | | | |
| | $r_3$ = 27.078 | $d_3$ = 2.417 | | $n_2$ = 1.50032 | $v_2$ = 81.9 |
| | $r_4$ = −85.400 | $d_4$ = 0.417 | | | |
| | $r_5$ = −64.585 | $d_5$ = 0.667 | | $n_3$ = 1.7495 | $v_3$ = 35.0 |
| | $r_6$ = 65.816 | | | | |
| | | $d_6$ = 16.614 → 17.947 | | | |
| f2 = −15.0 | $r_7$ = −31.899 | $d_7$ = 1.083 | | $n_4$ = 1.69895 | $v_4$ = 30.0 |
| | $r_8$ = −10.884 | $d_8$ = 0.333 | | $n_5$ = 1.60311 | $v_5$ = 60.7 |
| | $r_9$ = 56.259 | $d_9$ = 0.667 | | | |

-continued

| | | f = 100 | F/5.6 | | |
|---|---|---|---|---|---|
| | $r_{10} = -182.572$ | $d_{10} = 0.5$ | | $n_6 = 1.6968$ | $\nu_6 = 55.6$ |
| | $r_{11} = 18.670$ | | | | |
| | | $d_{11} = 2.888 \rightarrow 1.555$ | | | |
| $f3 = 40.222$ | $\begin{cases} r_{12} = -49.985 \\ r_{13} = -14.370 \end{cases}$ | $d_{12} = 0.833$ | | $n_7 = 1.50032$ | $\nu_7 = 81.9$ | where, as viewed from the object side, $r_1, r_2, r_3 \cdots$ denote radii of curvature of the surface of the lenses; $d_1, d_2, d_3 \cdots$ denote lens thicknesses and air spaces between lenses; $n_1, n_2, n_3 \cdots$ denote refractive index of glasses; and $\nu_1, \nu_2, \nu_3 \cdots$ denote Abbe numbers of the glasses.

13. A telephoto lens system according to claim 1, wherein

| | | f = 100 | F/8 | | |
|---|---|---|---|---|---|
| | $r_1 = 44.142$ | $d_1 = 1.167$ | $n_1 = 1.5168$ | $\nu_1 = 64.2$ | |
| | $r_2 = -61.667$ | $d_2 = 0.033$ | | | |
| $f1 = 40.667$ | $r_3 = 29.157$ | $d_3 = 1.367$ | $n_2 = 1.50032$ | $\nu_2 = 81.9$ | |
| | $r_4 = -58.842$ | $d_4 = 1.167$ | $n_3 = 1.7495$ | $\nu_3 = 35.0$ | |
| | $r_5 = 83.740$ | | | | |
| | | $d_5 = 22.208 \rightarrow 24.541$ | | | |
| | $r_6 = 0.0$ | $d_6 = 0.8$ | $n_4 = 1.69895$ | $\nu_4 = 30.0$ | |
| | $r_7 = -14.985$ | $d_7 = 0.250$ | $n_5 = 1.5168$ | $\nu_5 = 64.2$ | |
| $f2 = -14.167$ | $r_8 = 15.833$ | $d_8 = 1.333$ | | | |
| | $r_9 = -18.333$ | $d_9 = 0.333$ | $n_6 = 1.61266$ | $\nu_6 = 44.3$ | |
| | $r_{10} = 39.917$ | | | | |
| | | $d_{10} = 4.483 \rightarrow 2.15$ | | | |
| | $r_{11} = 14.333$ | $d_{11} = 2.767$ | $n_7 = 1.50032$ | $\nu_7 = 81.9$ | |
| | $r_{12} = 79.515$ | $d_{12} = 18.6$ | | | |
| $f3 = 34.833$ | $r_{13} = -6.995$ | $d_{13} = 0.8$ | $n_8 = 1.76684$ | $\nu_8 = 46.6$ | |
| | $r_{14} = -11.790$ | $d_{14} = 0.067$ | | | |
| | $r_{15} = 0.0$ | $d_{15} = 1.7667$ | $n_9 = 1.51454$ | $\nu_9 = 54.6$ | |
| | $r_{16} = -11.798$ | Bf = 13.511 | | | | where, as viewed from the object side, $r_1, r_2, r_3 \cdots$ denote radii of curvature of the surface of the lenses; $d_1, d_2, d_3 \cdots$ denote lens thicknesses and air spaces between lenses; $n_1, n_2, n_3 \cdots$ denote refractive index of glasses; and $\nu_1, \nu_2, \nu_3 \cdots$ denote Abbe numbers of the glasses.

14. A telephoto lens system according to claim 1, wherein

| | | f = 100 | F/8 | | |
|---|---|---|---|---|---|
| | $r_1 = 22.409$ | $d_1 = 1.813$ | $n_1 = 1.50032$ | $\nu_1 = 81.9$ | |
| | $r_2 = -52.905$ | $d_2 = 0.038$ | | | |
| $f1 = 28.125$ | $r_3 = 21.406$ | $d_3 = 1.763$ | $n_2 = 1.50032$ | $\nu_2 = 81.9$ | |
| | $r_4 = -59.375$ | $d_4 = 0.388$ | | | |
| | $r_5 = -45.0$ | $d_5 = 0.625$ | $n_3 = 1.7495$ | $\nu_3 = 35.0$ | |
| | $r_6 = 55.968$ | | | | |
| | | $d_6 = 12.192 \rightarrow 13.067$ | | | |
| | $r_7 = -21.434$ | $d_7 = 0.813$ | $n_4 = 1.69895$ | $\nu_4 = 30.0$ | |
| | $r_8 = -8.861$ | $d_8 = 0.288$ | $n_5 = 1.5168$ | $\nu_5 = 64.2$ | |
| $f2 = -11.25$ | $r_9 = 60.284$ | $d_9 = 0.5$ | | | |
| | $r_{10} = -48.75$ | $d_{10} = 0.375$ | $n_6 = 1.6968$ | $\nu_6 = 55.6$ | |
| | $r_{11} = 13.432$ | | | | |
| | | $d_{11} = 1.472 \rightarrow 0.597$ | | | |

-continued $f = 100 \quad F/8$ $f_3 = 40.0$ $\begin{cases} r_{12} = -20.75 \\ r_{13} = -10.399 \\ r_{14} = -19.068 \\ r_{15} = -28.75 \\ r_{16} = -18.584 \end{cases}$ $\begin{aligned} d_{12} &= 0.5 \\ d_{13} &= 28.067 \\ d_{14} &= 0.5 \\ d_{15} &= 0.375 \end{aligned}$ $\begin{aligned} n_7 &= 1.51454 & \nu_7 &= 54.6 \\ n_8 &= 1.5168 & \nu_8 &= 64.2 \\ n_9 &= 1.51118 & \nu_9 &= 50.9 \end{aligned}$ where, as viewed from the object side $r_1, r_2, r_3$ - - - denote radii of curvature of the surface of the lenses; $d_1, d_2, d_3$ - - - denote lens thicknesses and air spaces between lenses; $n_1, n_2, n_3$ - - - denote refractive index of glasses; and $\nu_1, \nu_2, \nu_3$ - - - denote Abbe numbers of the glasses.

* * * * *